(12) United States Patent
Yamamoto

(10) Patent No.: US 9,649,904 B2
(45) Date of Patent: May 16, 2017

(54) STROKE SENSOR AND FLUID SPRING WITH STROKE SENSOR

(71) Applicant: VOLVO TRUCK CORPORATION, Gothenburg (SE)

(72) Inventor: Shoichi Yamamoto, Saitama (JP)

(73) Assignee: Volvo Truck Corporation, Gothenburg (CH)

( * ) Notice: Subject to any disclaimer, the term of this patent is extended or adjusted under 35 U.S.C. 154(b) by 0 days.

(21) Appl. No.: 14/443,127

(22) PCT Filed: May 13, 2013

(86) PCT No.: PCT/JP2013/063272
§ 371 (c)(1),
(2) Date: Sep. 25, 2015

(87) PCT Pub. No.: WO2014/076984
PCT Pub. Date: May 22, 2014

(65) Prior Publication Data
US 2016/0016450 A1    Jan. 21, 2016

(30) Foreign Application Priority Data
Nov. 15, 2012 (JP) .................................. 2012-251398

(51) Int. Cl.
B60G 11/27    (2006.01)
B60G 9/00     (2006.01)
(Continued)

(52) U.S. Cl.
CPC .............. B60G 11/27 (2013.01); B60G 9/003 (2013.01); F16F 9/05 (2013.01); F16F 9/3292 (2013.01);
(Continued)

(58) Field of Classification Search
CPC ... F16F 9/04; F16F 9/05; F16F 9/3292; B60G 11/26; B60G 11/27; B60G 2202/15;
(Continued)

(56) References Cited

U.S. PATENT DOCUMENTS 5,521,497 A *  5/1996  Schneider ................ G01B 7/14
                                                    267/64.19
5,574,365 A    11/1996 Oyama et al.
(Continued)

FOREIGN PATENT DOCUMENTS

CA    2419500 A1    8/2004
CN    1365322 A     8/2002
(Continued)

Primary Examiner — Melanie Torres Williams
(74) Attorney, Agent, or Firm — Laurence A. Greenberg; Werner H. Stemer; Ralph E. Locher

(57) ABSTRACT

A stroke sensor detects a distance between a first member and a second member provided movably toward and away from the first member. The stroke sensor includes a magnetism generator provided in the first member and configured to generate magnetism, a magnetic body provided in the second member and configured to be biased toward the magnetism generator by a magnetic force generated from the magnetism generator, and a pressure detector provided in the second member, held in contact with the magnetic body biased by the magnetic force from the magnetism generator and configured to detect the distance between the first and second members on the basis of a change of a pressure acting from the magnetic body.

5 Claims, 2 Drawing Sheets

(51) Int. Cl.
*G01D 5/14* (2006.01)
*F16F 9/05* (2006.01)
*F16F 9/32* (2006.01)
*G01L 9/00* (2006.01)
*G01L 9/08* (2006.01)

(52) U.S. Cl.
CPC ............ *G01D 5/145* (2013.01); *G01D 5/147* (2013.01); *G01L 9/0089* (2013.01); *G01L 9/08* (2013.01); *B60G 2202/152* (2013.01); *B60G 2202/1524* (2013.01); *B60G 2204/111* (2013.01); *B60G 2204/4302* (2013.01); *B60G 2206/601* (2013.01); *B60G 2400/252* (2013.01); *B60G 2401/17* (2013.01)

(58) Field of Classification Search
CPC ...... B60G 2202/152; B60G 2202/1524; B60G 2204/11; B60G 2204/111; B60G 2400/25; B60G 2400/252; B60G 2401/10; B60G 2401/17; G01D 5/12; G01D 5/14; G01D 5/142; G01D 5/145; G01D 5/147; G01L 9/0089; G01L 9/08
See application file for complete search history.

(56) References Cited

U.S. PATENT DOCUMENTS

| | | | |
|---|---|---|---|
| 6,568,665 | B2 | 5/2003 | Foerster et al. |
| 7,621,538 | B2 | 11/2009 | Nordmeyer et al. |
| 7,999,539 | B2 | 8/2011 | Nishide |
| 2005/0077691 | A1* | 4/2005 | Witters ................. B60G 11/27 280/5.514 |

FOREIGN PATENT DOCUMENTS

| | | |
|---|---|---|
| CN | 2632628 Y | 8/2004 |
| CN | 101373209 A | 2/2009 |
| CN | 201297923 Y | 8/2009 |
| JP | 62232501 A | 10/1987 |
| JP | 298233 U | 8/1990 |
| JP | 08121521 A | 5/1996 |

* cited by examiner

STROKE SENSOR AND FLUID SPRING WITH STROKE SENSOR

TECHNICAL FIELD

The present invention relates to a stroke sensor and a fluid spring with a stroke sensor.

BACKGROUND ART

Conventionally, a fluid spring utilizing a pressure of compressive fluid such as air has been used in a suspension device of a vehicle. In the case of using the fluid spring, a vehicle height can be arbitrarily adjusted by the pressure of the compressive fluid, but a stroke sensor for detecting the vehicle height from a stroke of the fluid spring needs to be additionally provided.

JP2002-307925A discloses an air suspension device for vehicle including an air spring arranged between a chassis frame and an axle and a sensor for detecting a stroke of the air spring from an angle of a lever which rotates as a vehicle height changes.

SUMMARY OF INVENTION

However, since a link mechanism such as the lever that rotates as the vehicle height changes and a sensor are provided in the air suspension device described in JP2000-307925A, the structure of the entire device has been complicated. Thus, a large space has been necessary in installing the air suspension device into a vehicle.

The present invention was developed in view of the above problem and aims to provide a stroke sensor applicable to an air spring and capable of space saving.

According to one aspect of this invention, a stroke sensor configured to detect a distance between a first member and a second member provided movably in directions toward and away from the first member is provided. The stroke sensor includes a magnetism generator provided in the first member, the magnetism generator being configured to generate magnetism, a magnetic body provided in the second member, the magnetic body being configured to be biased toward the magnetism generator by a magnetic force generated from the magnetism generator, and a pressure detector provided in the second member, the pressure detector being held in contact with the magnetic body biased by the magnetic force from the magnetism generator, the pressure detector being configured to detect the distance between the first and second members on the basis of a change of a pressure acting from the magnetic body.

The details as well as other features and advantages of this invention are set forth in the remainder of the specification and are shown in the accompanying drawings.

DESCRIPTION OF EMBODIMENT

Figure 1:
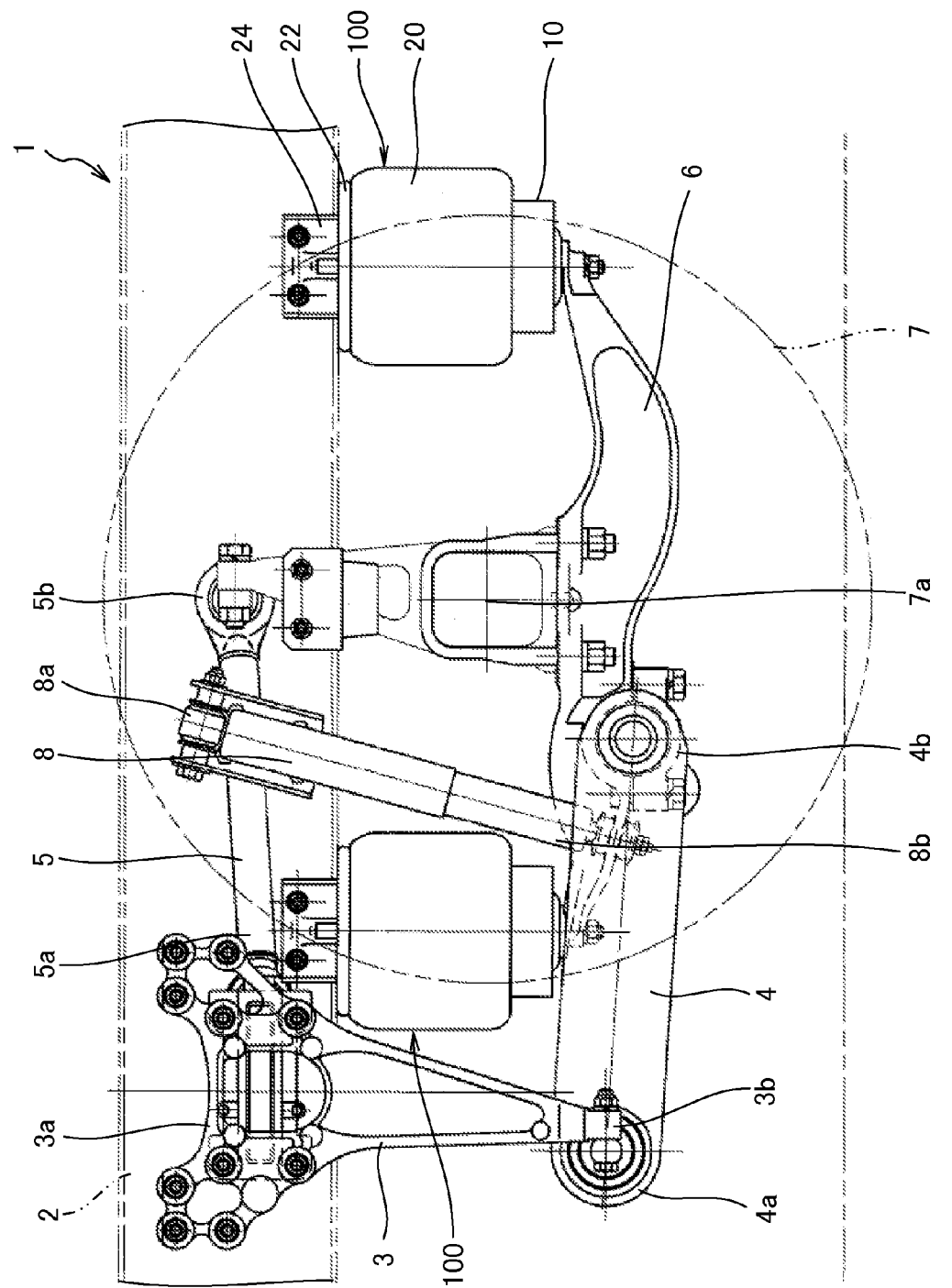
FIG. 1 is a side view of a suspension device to which a fluid spring according to an embodiment of the present invention is applied.

Hereinafter, a stroke sensor 30 according to an embodiment of the present invention and an air spring 100 as a fluid spring with the stroke sensor 30 are described with reference to the drawings. In the air spring 100, compressed air is used as compressive fluid.

First, the configuration of a suspension device 1 to which the air springs 100 are applied is described with reference to FIG. 1.

The suspension device 1 is an air suspension device of a trailing arm type. In FIG. 1, a left side is a front side of a vehicle (not shown). The suspension device 1 includes a hanger bracket 3 extending downward from a frame 2, a cantilevered lower arm 4 supported on the hanger bracket 3, a cantilevered upper arm 5 supported on the frame 2, and a suspension beam 6 supported on the frame 2 via the lower arm 4 and the upper arm 5 and integrally provided to a rear wheel axle 7a.

The hanger bracket 3 is formed into an inverted triangular shape, one end 3a of a bottom side is fixed to the frame 2 and another end 3b on a vertex side is located below the frame 2.

One end 4a of the lower arm 4 is supported on the other end 3b of the hanger bracket 3. The lower arm 4 is so provided that another end 4b is capable of arcuate motion about the one end 4a supported on the hanger bracket 3.

The upper arm 5 is provided substantially in parallel to the lower arm 4. One end 5a of the upper arm 5 is supported on the frame 2. The upper arm 5 is so provided that another end 5b is capable of arcuate motion about the one end 5a supported on the frame 2.

The suspension beam 6 is supported by the other end 4a of the lower arm 4 and the other end 5b of the upper arm 5. The suspension beam 6 is provided to be vertically movable in conjunction with arcuate motions of the lower arm 4 and the upper arm 5. In this way, wheels 7 coupled to the rear wheel axle 7a are vertically movable relative to the frame 2 by the arcuate motions of the lower arm 4 and the upper arm 5.

The suspension device 1 includes the air springs 100 arranged between the frame 2 and the wheels 7 to cushion vertical movements and a shock absorber 8 provided in parallel to the air springs 100 to attenuate vertical movements.

The air spring 100 is provided on each of front and rear ends of the suspension beam 6. That is, a pair of air springs 100 is provided before and after the rear wheel axle 7a. The air spring 100 is supported by being sandwiched between the frame 2 and the suspension beam 6 and cushions vertical movements between the frame 2 and the suspension beam 6 by an elastic force thereof. The air spring 100 is described in detail later with reference to FIG. 2.

One end 8a of the shock absorber 8 is fixed to the frame 2 and another end 8b is fixed to the suspension beam 6. In this way, the shock absorber 8 attenuates vertical movements between the frame 2 and the suspension beam 6.

Figure 2:
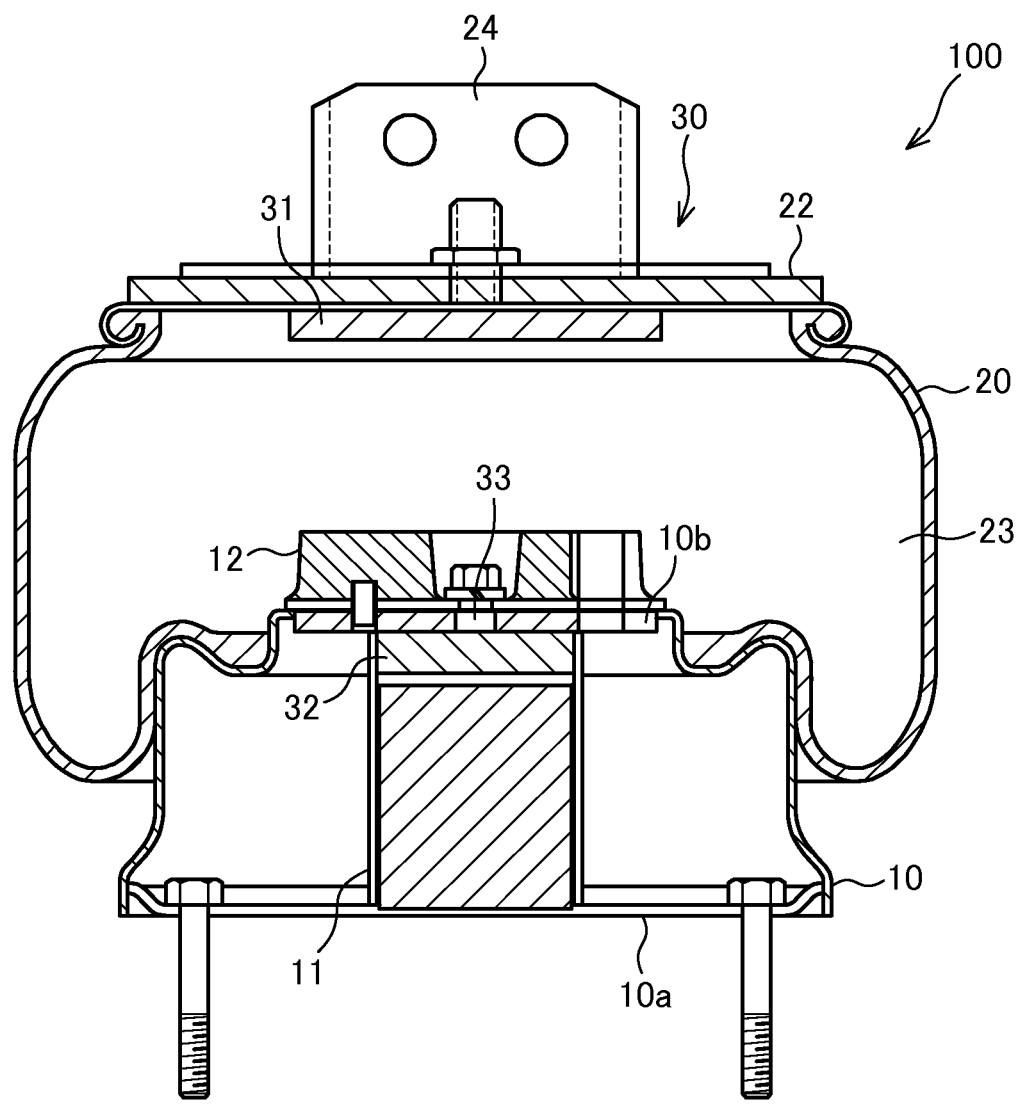
FIG. 2 is a side sectional view of the fluid spring according to the embodiment of the present invention.

Next, the configuration of the air spring 100 is described mainly with reference to FIG. 2.

The air spring 100 is provided between the suspension beam 6 supporting the wheels 7 and the frame 2 and of a sleeve type capable of adjusting a spring constant by supplied compressed air. The air spring 100 includes a diaphragm 20 as a bag-like elastic member for defining a fluid chamber 23 which expands and contracts according to an air pressure, a top plate 22 provided on an upper end part of the diaphragm 20, and a piston 10 formed into a hollow cylindrical shape and provided movably toward and away from the diaphragm 20.

The piston 10 is formed by a rigid body such as metal. A bottom part 10a of the piston 10 is fixed to the suspension beam 6. The piston 10 is provided with a circular plate 10*b* for closing an upper-end opening. A supporting part 11 for supporting the top plate 22 when the pressure of the compressed air in the diaphragm 20 decreases stands in a space formed in the piston 10.

A cushion part 12 formed of an elastic member such as rubber is mounted on the upper surface of the plate 10*b*. By providing this cushion part 12, a shock when the top plate 22 comes into contact is absorbed.

The supporting part 11 is a hollow cylindrical member provided on the inner periphery of the piston 10. The supporting part 11 couples between the bottom part 10*a* and the plate 10*b* of the piston 10. The supporting part 11 causes the weight of the vehicle transmitted from the top plate 22 to be supported by the bottom part 10*a* when the top plate 22 comes into contact with the cushion part 12. A magnetic body 32 and a piezoelectric element 33 of the stroke sensor 30 to be described later are provided on the inner periphery of the supporting part 11.

The diaphragm 20 is formed into a bag shape by an elastic body such as rubber. The diaphragm 20 is formed to cover the upper surface of the piston 10. A lowermost part of the diaphragm 20 is folded inwardly and fixed to a part of the piston 10 near the outer periphery of the plate 10*b*. In this way, the piston 10 can vertically move toward and away from the diaphragm 20.

The compressed air compressed by a compressor (not shown) and stored in a surge tank (not shown) is supplied and filled into the fluid chamber 23. Further, the compressed air filled in the fluid chamber 23 can be released into the atmosphere by opening a valve (not shown).

The top plate 22 is provided in contact with the frame 2 (see FIG. 1). The top plate 22 is fixed to the frame 2 via a bracket 24. In this way, the air spring 100 supports the frame 2 by an elastic force thereof between the suspension beam 6 and the frame 2. The top plate 22 is provided with a magnetism generator 31 of the stroke sensor 30 to be described later.

Further, the air spring 100 includes the stroke sensor 30 for detecting a distance between the top plate 22 and the supporting part 11 provided movably in directions toward and away from the top plate 22. Here, the top plate 22 provided on the diaphragm 20 corresponds to a first member and the supporting part 11 provided in the piston 10 corresponds to a second member.

The stroke sensor 30 is provided on the top plate 22 and includes the magnetism generator 31 for generating magnetism, the magnetic body 32 provided in the supporting part 11 and biased toward the magnetism generator 31 by a magnetic force generated from the magnetism generator 31, and the piezoelectric element 33 as a pressure detector provided in the supporting part 11, held in contact with the magnetic body 32 biased by the magnetic force from the magnetism generator 31 and configured to detect the distance between the top plate 22 and the supporting part 11 on the basis of a change of a pressure acting from the magnetic body 32.

The magnetism generator 31 is a permanent magnet. The magnetism generator 31 is fixed to the lower surface of the top plate 22 to be located above the supporting part 11. The magnetism generator 31 generates a magnetic field in a direction to attract the magnetic body 32.

The magnetic body 32 is provided movably in an axial direction on the inner periphery of the hollow cylindrical supporting part 11. The magnetic body 32 is biased toward the magnetism generator 31 by the magnetic field generated by the magnetism generator 31. The magnetic body 32 is biased toward the magnetism generator 31 with a stronger force with a decrease in distance to the magnetism generator 31.

The piezoelectric element 33 is provided to be located between the magnetic body 32 and the magnetism generator 31 on the inner periphery of the supporting part 11. The piezoelectric element 33 is fixed to the plate 10*b* so as not to move in the axial direction relative to the supporting part 11. The magnetic body 32 biased by the magnetic force from the magnetism generator 31 is in contact with the lower surface of the piezoelectric element 33.

The magnitude of a voltage output from the piezoelectric element 33 changes according to the magnitude of the acting pressure. The piezoelectric element 33 outputs a voltage corresponding to the distance between the top plate 22 and the supporting part 11 on the basis of the change of the pressure acting from the magnetic body 32.

Next, functions of the stroke sensor 30 are described.

If a vehicle height of the vehicle is relatively high, the distance between the frame 2 and the suspension beam 6 is long, wherefore the piston 10 enters the diaphragm 20 only to a small extent. Thus, a distance between the magnetism generator 31 provided on the top plate 22 and the magnetic body 32 provided in the supporting part 11 is long. Hence, a biasing force for attracting the magnetic body 32 by the magnetism generator 31 is relatively small since the influence of the magnetic force of the magnetism generator 31 on the magnetic body 32 is small. Therefore, a voltage output by the piezoelectric element 33 is also small since the pressure acting on the piezoelectric element 33 from the magnetic body 32 is relatively small.

On the other hand, if the vehicle height of the vehicle is relatively low, the distance between the frame 2 and the suspension beam 6 is short, wherefore the piston 10 enters the diaphragm 20 to a large extent. Thus, the distance between the magnetism generator 31 provided on the top plate 22 and the magnetic body 32 provided in the supporting part 11 is short. Hence, the biasing force for attracting the magnetic body 32 by the magnetism generator 31 is relatively large since the influence of the magnetic force of the magnetism generator 31 on the magnetic body 32 is large. Therefore, a voltage output by the piezoelectric element 33 is also large since the pressure acting on the piezoelectric element 33 from the magnetic body 32 is relatively large.

As just described, the magnitude of the voltage output from the piezoelectric element 33 changes according to the vehicle height of the vehicle. Thus, by monitoring the voltage output from the piezoelectric element 33, the vehicle height of the vehicle can be detected.

A conventional stroke sensor includes a link mechanism with a lever which rotates as a vehicle height changes, and a sensor for detecting a stroke of an air spring from a rotational angle of the lever. In the case of applying this stroke sensor to the air spring 100, the link mechanism such as the lever and the sensor are provided outside the air spring 100. Thus, the structure of the entire device has been complicated and a large space has been necessary at the time of installation into a vehicle.

Contrary to this, in the stroke sensor 30, the stroke of the air spring 100 can be detected and the vehicle height of the vehicle can be detected from the magnitude of the voltage output from the piezoelectric element 33. As just described, by providing the top plate 22 with the magnetism generator 31 and providing the supporting part 11 with the magnetic body 32 and the piezoelectric element 33, the stroke sensor 30 can be housed in the air spring 100. Thus, space saving is possible in the case of applying the stroke sensor 30 to the air spring 100.

Further, the magnetism generator 31 is fixed to the top plate 22 and the magnetic body 32 and the piezoelectric element 33 are provided on the inner periphery of the supporting part 11. Thus, a volume of the fluid chamber 23 formed in the diaphragm 20 is the same as in the case where the stroke sensor 30 is not provided. Therefore, the stroke sensor 30 can be built in the air spring 100 without affecting the operation of the air spring 100.

According to the above embodiment, the following effects are exhibited.

The magnetic body 32 of the supporting part 11 is biased by the magnetic force from the magnetism generator 31 of the top plate 22 and that biasing force is detected by the piezoelectric element 33, whereby the distance between the top plate 22 and the supporting part 11 is detected. By providing the top plate 22 with the magnetism generator 31 and providing the supporting part 11 with the magnetic body 32 and the piezoelectric element 33 in this way, the stroke sensor 30 can be housed in the air spring 100. Thus, space saving is possible in the case of applying the stroke sensor 30 to the air spring 100.

Embodiments of this invention were described above, but the above embodiments are merely examples of applications of this invention, and the technical scope of this invention is not limited to the specific constitutions of the above embodiments.

For example, the supporting part 11 may be provided with the magnetism generator 31 and the top plate 22 may be provided with the magnetic body 32 and the piezoelectric element 33. Even in this case, the stroke sensor 30 can be built in the air spring 100 as in the embodiment described above. It should be noted that, in this case, the supporting part 11 provided in the piston 10 corresponds to the first member and the top plate 22 provided on the diaphragm 20 corresponds to the second member.

This application claims priority based on Japanese Patent Application No. 2012-251398 filed with the Japan Patent Office on Nov. 15, 2012, the entire contents of which are incorporated into this specification.

The embodiment of this invention in which an exclusive property or privilege is claimed are defined as follows:

1. A stroke sensor configured to detect a distance between a first member and a second member provided movably in directions toward and away from the first member, the stroke sensor comprising:
   a magnetism generator provided in the first member, the magnetism generator being configured to generate magnetism;
   a magnetic body provided in the second member, the magnetic body being configured to be biased toward the magnetism generator by a magnetic force generated from the magnetism generator; and
   a pressure detector provided in the second member, the pressure detector being held in contact with the magnetic body biased by the magnetic force from the magnetism generator, the pressure detector being configured to detect the distance between the first and second members on the basis of a change of a pressure acting from the magnetic body.

2. The stroke sensor according to claim 1, wherein: the pressure detector is a piezoelectric element configured to output a voltage corresponding to the distance between the first and second members.

3. A fluid spring including the stroke sensor according to claim 1 and capable of adjusting a spring constant by supplied compressive fluid, the fluid spring further comprising:
   bag-shaped elastic member configured to define a fluid chamber, the fluid chamber expanding and contracting according to a fluid pressure; and
   a piston formed into a tubular shape, the piston being provided movably toward and away from the bag-shaped elastic member;
   wherein one of the first and second members is provided in the bag-shaped elastic member; and the other of the first and second members is provided in the piston.

4. The fluid spring according to claim 3, wherein the first member is a top plate provided on an upper end part of the bag-shaped elastic member.

5. The fluid spring according to claim 4, wherein the second member is a supporting part provided in the piston, the supporting part being configured to support the top plate when a pressure of the compressive fluid in the bag-shaped elastic member decreases.

* * * * *